(12) United States Patent
White et al.

(10) Patent No.: US 9,405,398 B2
(45) Date of Patent: Aug. 2, 2016

(54) TOUCH SENSITIVE COMPUTING SURFACE FOR INTERACTING WITH PHYSICAL SURFACE DEVICES

(71) Applicant: FTL Labs Corporation, Somerville, MA (US)

(72) Inventors: Michael Alton White, Amherst, MA (US); Leonard Arthur White, Los Angeles, CA (US); Christopher Lewis Templeman, Somerville, MA (US)

(73) Assignee: FTL LABS CORPORATION, Somerville, MA (US)

( * ) Notice: Subject to any disclaimer, the term of this patent is extended or adjusted under 35 U.S.C. 154(b) by 0 days.

(21) Appl. No.: 14/476,528

(22) Filed: Sep. 3, 2014

(65) Prior Publication Data

US 2015/0062045 A1     Mar. 5, 2015

Related U.S. Application Data

(60) Provisional application No. 61/872,934, filed on Sep. 3, 2013.

(51) Int. Cl.
| | |
|---|---|
| *G06F 3/041* | (2006.01) |
| *G06F 3/0488* | (2013.01) |
| *G06F 3/03* | (2006.01) |
| *G06F 3/0481* | (2013.01) |

(52) U.S. Cl.
CPC .............. *G06F 3/0416* (2013.01); *G06F 3/03* (2013.01); *G06F 3/0481* (2013.01); *G06F 3/0488* (2013.01); *G06F 2203/04104* (2013.01)

(58) Field of Classification Search
CPC ....... G06F 3/03; G06F 3/0412; G06F 3/0416; G06F 3/0482; G06F 3/0484; G06F 3/0488; G06F 3/04817; G06F 3/1423; G06F 2203/04104

USPC .................. 345/156–184; 446/321; 434/156; 715/765, 771

See application file for complete search history.

(56) References Cited

U.S. PATENT DOCUMENTS

| | | | | |
|---|---|---|---|---|
| 6,004,135 | A * | 12/1999 | Trattner | G09B 5/062 434/156 |
| 8,407,606 | B1 * | 3/2013 | Davidson | G06F 3/0488 345/173 |
| 2009/0167704 | A1 * | 7/2009 | Terlizzi | G06F 3/016 345/173 |
| 2009/0307623 | A1 * | 12/2009 | Agarawala | G06F 3/0483 715/765 |
| 2011/0074710 | A1 * | 3/2011 | Weeldreyer | G06F 3/0481 345/173 |
| 2011/0078597 | A1 * | 3/2011 | Rapp | G06F 3/04883 715/765 |
| 2011/0185321 | A1 * | 7/2011 | Capela | G06F 3/0488 715/863 |
| 2011/0216015 | A1 * | 9/2011 | Edwards | G06F 3/041 345/173 |
| 2012/0030568 | A1 * | 2/2012 | Migos | G06F 3/0486 715/702 |

(Continued)

*Primary Examiner* — Prabodh M Dharia
(74) *Attorney, Agent, or Firm* — Wilmer Cutler Pickering Hale and Dorr LLP

(57) ABSTRACT

Methods and systems for operating a touch sensitive display are disclosed. In one embodiment, a method for operating a touch sensitive display is provided that includes detecting a plurality of inputs via the touch sensitive display, interpreting, using at least one compute processor, each input in accordance with a location of the associated input on the touch sensitive display and a gesture of the associated input, generating a display based on the interpretation; updating a state of objects displayed on the touch sensitive display based on the interpretation, determining whether to generate an output to another device based on the interpretation, sending the output to the other device based on the determination, and displaying the generated display on the touch sensitive display.

10 Claims, 14 Drawing Sheets

(56) References Cited

U.S. PATENT DOCUMENTS

| | | | | |
|---|---|---|---|---|
| 2012/0066079 A1* | 3/2012 | Falzone | G06Q 20/20 | 705/16 |
| 2012/0069131 A1* | 3/2012 | Abelow | G06Q 10/067 | 348/14.01 |
| 2012/0290950 A1* | 11/2012 | Rapaport | H04L 51/32 | 715/753 |
| 2013/0095725 A1* | 4/2013 | Von Mohr | A63H 3/48 | 446/321 |
| 2013/0165215 A1* | 6/2013 | Arezina | G07F 17/3206 | 463/25 |
| 2014/0184496 A1* | 7/2014 | Gribetz | G02B 27/017 | 345/156 |
| 2014/0194188 A1* | 7/2014 | Kosta | G07F 17/3279 | 463/25 |
| 2014/0210748 A1* | 7/2014 | Narita | G06F 3/0354 | 345/173 |
| 2014/0351732 A1* | 11/2014 | Nasraoui | G06F 3/0488 | 715/771 |
| 2015/0067495 A1* | 3/2015 | Bernstein | G06F 3/0488 | 715/702 |
| 2015/0323340 A1* | 11/2015 | McGavran | G01C 21/00 | 701/425 |

\* cited by examiner

TOUCH SENSITIVE COMPUTING SURFACE FOR INTERACTING WITH PHYSICAL SURFACE DEVICES

CROSS-REFERENCE PARAGRAPH

This application claims priority to U.S. Patent Application No. 61/872,934 filed on Sep. 3, 2013, the entire contents of which are herein incorporated by reference.

TECHNICAL FIELD

This disclosure relates generally to systems and methods for managing the interaction between users, a touch sensitive computing surface, and physical devices placed on the computing surface.

BACKGROUND

Touch screen devices that allow direct interaction with displays are becoming increasingly prevalent in the marketplace. One type of touch screen is called a "touch table" as the display is horizontal, allowing objects to be placed on it, similar to any table or counter-top. Touch-sensitive devices may detect the presence and position of finger-based or object-based input, enabling the possibility of new ways to interact with electronic devices, or for electronic devices to interact with each other.

The popularity of recent, small-scale touch screen devices, such as iPad® from APPLE®, means that touch screen devices may be found among many schools and family households, and the penetration of larger touch screen systems in the marketplace is expected to increase.

SUMMARY

The present disclosure relates to systems and methods for operating a touch sensitive display and computing surface, including interactions with users and physical surface devices placed on or near the computing surface. The system may include a module to detect the state of user-operable controls located on the physical surface devices and wirelessly send corresponding data to modules that control the computing surface. The system may further include a module to detect the location of the physical surface devices and other touch or gesture inputs. This data, in combination with the data corresponding to surface device controls may be sent to a main surface device module. The main surface device module, based on this data, may update the graphical display of the touch sensitive computing surface, update the menus and state information stored by the computing surface, and the stored state of the physical surface devices.

DETAILED DESCRIPTION

Figure 1:
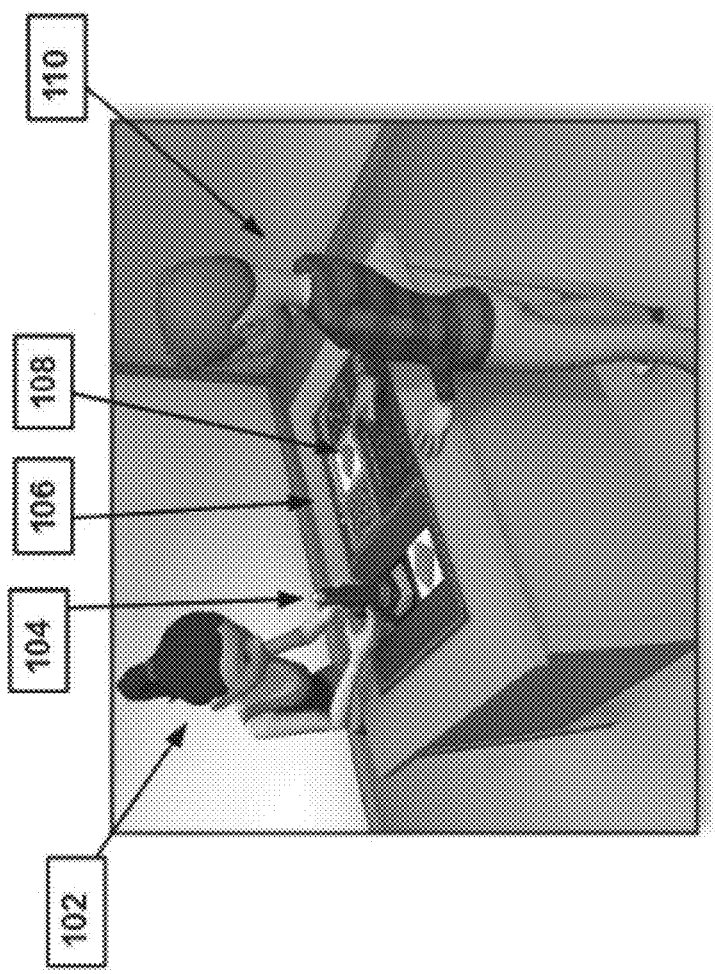
FIGS. 1 and 2 illustrate a touch sensitive computing surface and physical surface devices placed on top of the computing surface, according to some embodiments of the present disclosure.

The prevalence of large touch screen systems suggests that the touch table environment may become a common working environment for a variety of functions, providing responses to user inputs, reactions to manipulation of objects on the touch surface, and multimedia information and game components. In particular, the possibility of devices specifically engineered to interact and communicate with touch surfaces is anticipated.

In an entertainment setting, physical toys and battery-operated electronic toys remain standard playthings, with collectible figures and objects remaining popular for imaginative toy play in the form of interaction between the figures and objects as well as the larger environment. In this context, kids are having increased exposure to touch screen devices making it desirable to provide new technologies, which may enhance the interactive experience with touch screen devices and their existing toys.

Touch tables represent natural environments for intuitive and seamless interfacing of tangible toys and electronics with software in educational and gaming contexts.

This disclosure describes user interface, software, and hardware approaches associated with the use and manipulation of objects on a touch computing surface or "touch table". The use of location tracking, object designs, touch controls, and two-way wireless communications, either alone or in combinations, to create a seamless "virtual reality" in which tangible objects and instruments interact with a touch computer is described. Some embodiments have applications in educational games and laboratory experiments. For example, some embodiments may be used as in-classroom technology. Other embodiments additionally have applications in the non-educational entertainment sector.

As an example of an embodiment that may be used in an educational setting, one may imagine a group of students around a touch table. Through software, the table may guide the students to collide two physical pucks together on the surface. If the students hit "start" on the touch display and slide the pucks, the path of the puck may be tracked and displayed. Furthermore, at the collision point of the pucks, vectors may be superimposed on the table display to illustrate velocity and conservation of momentum. The students may open up a graphical control panel for the puck and change its coefficient of friction and see information about it. By touching the path, the students may display plots of the displacement versus time, or overlay velocity versus time and acceleration versus time. The students may also access the raw data underlying these displays. In this example, the specific hardware and software combination allows the touch table to augment the reality of a tangible teaching lab experiment and allows students to explore the equipment, graphical control panels, real-time data being generated, and multimedia analysis.

As an example of the use of some embodiments in an entertainment setting, one may imagine interactive electronic action toys set on large-format, multi-player touch tables. Collectable figures representing characters, vehicles, game-pieces, or similar are tracked and identified on a large, iPad-like surface, becoming integrated into an augmented video game. These figures may function as more than just input devices. For example, two-way communications between the table and the figures may allow video menu controls to change the function of the figure electronics. For example, the communications may instruct the figures to turn on and off lights, change sounds, or enable certain modes. Plus, elements of the game software may be channeled through the figures as output devices. For example, individual figures may be configured to call for the player's attention when something is happening to them and indicate parameters from the game play. The use of hollow or transparent elements in the game objects can also allow specific viewing features of the underlying touch table graphics.

FIG. 1 is a multi-user touch table indicating the use of touch-driven software and a microscope-shaped surface device to create a virtual experiment, according to some embodiments. FIG. 1 includes users 102 and 110, a physical surface device 104, a touch-sensitive computing surface 106, and software displayed on the touch-sensitive computing surface 108. In the figure, the software displayed on the touch-sensitive computing surface 108 is an interactive graphical display that may adapt to the position of both fingers and objects on the surface. Therefore, the touch table graphics image seen through the eyepiece of the microscope may be expanded, blurred, or sharpened differently than the surrounding graphics and in response to user inputs.

Users 102 interact with physical surface devices 104 placed on a touch-sensitive computing surface 106. The software displayed 108 on the touch computer reacts to touch gestures from the users, placement of the surface devices, and electronic communication with the surface device sensors and input devices such as knobs and buttons. Additionally, the surface device may have output modes (sounds, lights, displays) triggered by the software. Additional users 110 may interact simultaneously with software touch interface components or additional surface devices. In the instance shown, a "virtual lab bench" is created by using a surface object that looks like a microscope and allows inspection of virtual objects with the software responding to magnification and focus knobs. While the image viewed by the user through the microscope may be generated on the touch table under the microscope surface object, the controls located on the microscope body (i.e., not physically attached to the touch table) may be used to modify the image seen through the surface device. This is achieved by sending wireless knob position data from the electronics of the microscope surface object to the touch table which are then interpreted by the touch table software. The resulting user experience is one of controlling the viewing parameters of the microscope using controls located on the microscope, such as focus and zoom, though the changes are actually updated through the touch table software. Similarly, if the microscope surface object is removed from the table, the display on the surface may be modified by the touch table software, eliminating the image that is intended to be seen through the microscope.

This embodiment is applicable to educational facilities and situations in which real-world instrument skills may be taught efficiently using virtual materials. The use of embodiments for virtual microscopes, chemistry experiments using beakers and real reagents, projectile motion analysis using real projectiles, and table-top robotics programmed with the touch table are all examples of this kind of application.

Figure 2:
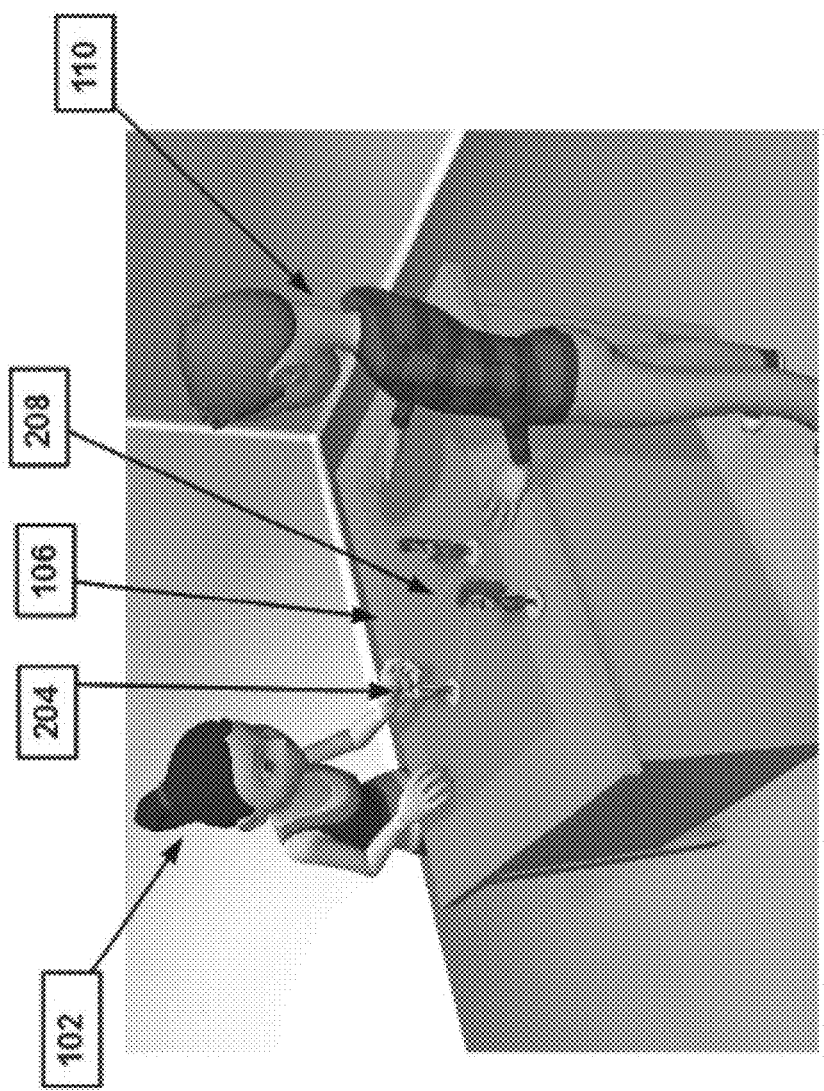

FIG. 2 is a different application of the same technology for game play, according to some embodiments. FIG. 2 includes users 102 and 110, surface objects 204 on a touch table 106 with game elements displayed on its surface 208. Here, action figures are used on the table top and their positions and orientations may be tracked by the touch surface. The figures may be passive, simply tracked by properties or identifiers recognized by the table, or active with batteries and internal circuitry. In the latter case, the figures may include output components, such as movement, lights and sounds, and input components, such as touch sensors, buttons, movable limbs, or knobs.

In FIG. 2, the physical surface devices 204 take the form of toys, models, or action figures. The software displayed 208 on the touch computer reacts to touch gestures from the users, placement of the surface devices, and electronic communication with the surface device sensors and input devices such as knobs and buttons. Additionally, the surface device may have output modes (movement, sounds, lights, displays) triggered by the software. Multiple users may interact with the toys while the software handles the game environment and rules such as attack modes, interaction modes, moves per turn, or attack range. In addition, touch table graphics may be visible in or through surface objects through hollow, transparent, or other image conduits.

Therefore, from the figures it is shown that both input and output modes are distributed between the touch surface and the surface devices, which may interact using with and/or contact and wireless communications.

Figure 3:
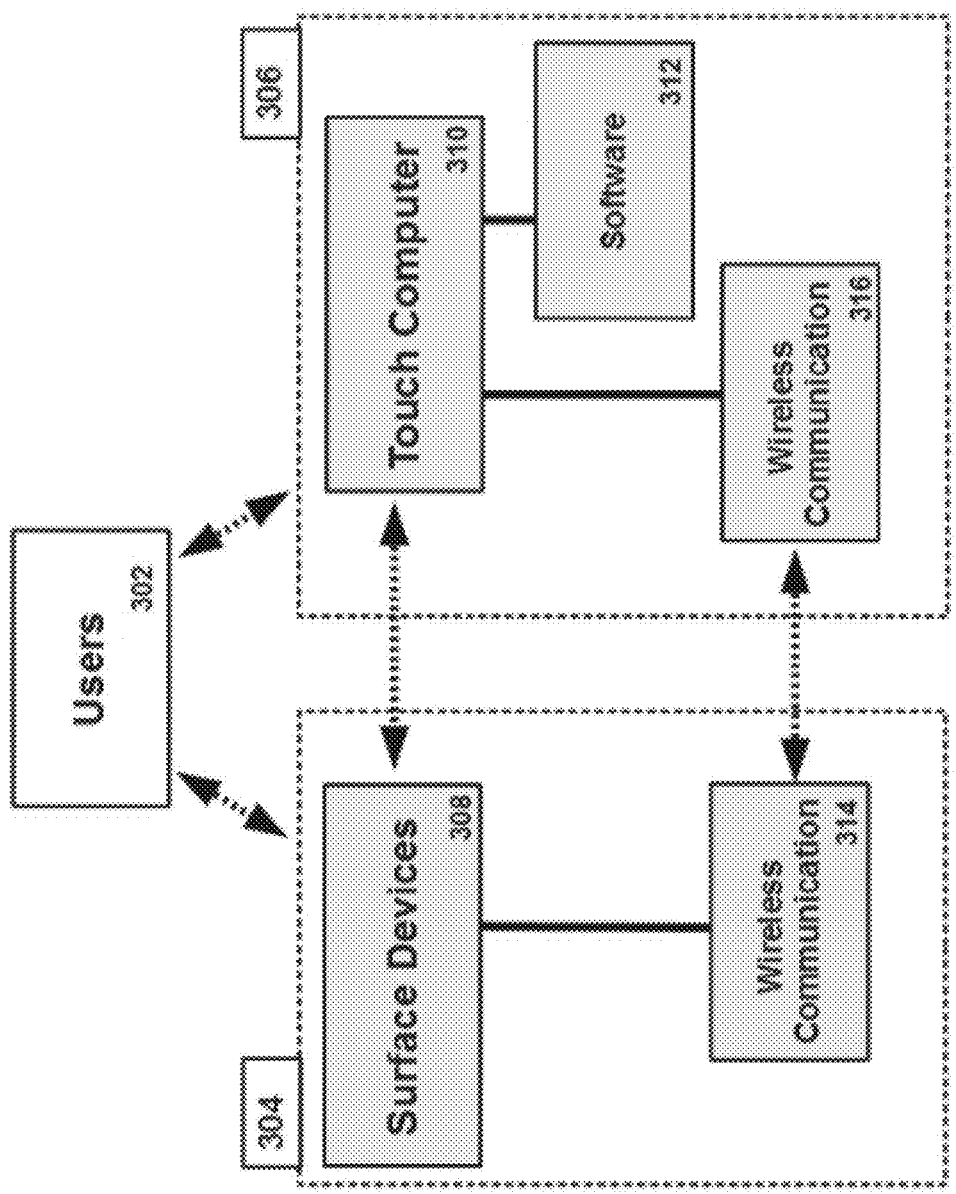
FIG. 3 is a system diagram illustrating system components related to communications channels, according to some embodiments of the present disclosure.

FIG. 3 is a system diagram illustrating system components related to the communications channels used to create a virtual reality experience, according to some embodiments. FIG. 3 includes representations of the user interactions (302), the surface devices (304) including the physical items (308) and their wireless communications capabilities (314), and also the touch table (306) including the actual computer (310) its software (312) and wireless capabilities (316). It is important to note that the user may naturally manipulate the surface objects for some interactions and manipulate virtual touch controls on the touch surface for others. In this figure elements managed by the touch devices is shaded in gray and those managed by the surface computer are shaded in blue.

FIG. 3 indicates that the users 302 interact with tangible surface devices (304) that are manipulated on a touch computer 306. The software 312 displayed on the touch computer surface interacts via user input gestures, the surface device location, and surface device input devices, such as knobs, buttons, and sensors. Surface device data may be sent from the surface device wireless communications channel 314 to the touch computer wireless system 316. Additionally wireless signals from the software may trigger output modes of the surface devices such as sounds, lights, or sensing modes.

An element of the some embodiments is the plurality of interaction modes between the touch surface and electronic surface devices. Both position and orientation may be tracked as well as more subtle input and output modes, the control information associated with some of the user inputs is passed by a wireless communications protocol, essentially invisible to the user. This communication may be achieved with any of several communications technologies and protocols including IR, RF, visible light, variable LED/LCD display markings, BlueTooth, ZigBee, WiFi or others. Note again that the gray elements handled by the surface devices communicate with the blue elements handled by the touch computer, shaded in blue, via both touch sensing and wireless information paths.

Figure 4:
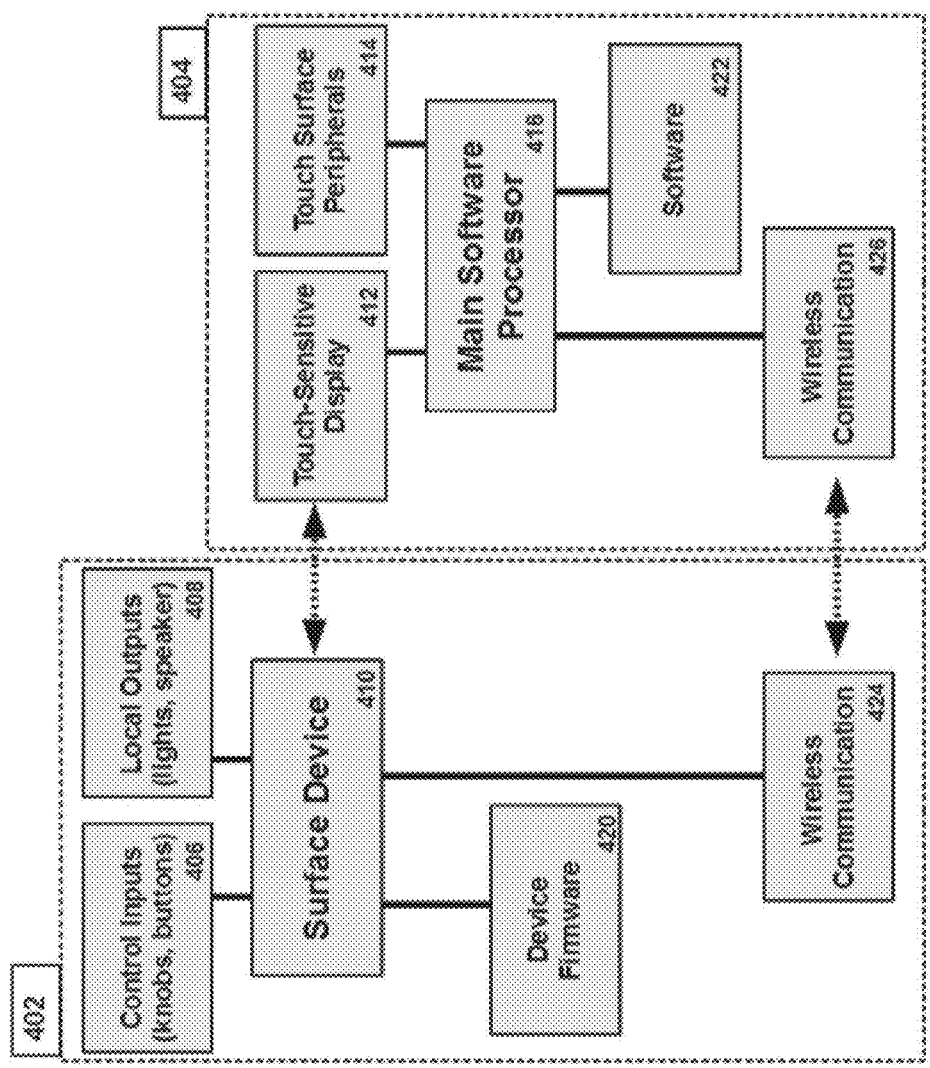
FIG. 4 is a system diagram illustrating a physical surface device and an associated touch sensitive computing surface, according to some embodiments of the present disclosure.

FIG. 4 is a system diagram illustrating in more detail both the communications and essential elements of a surface device 402 and the touch table 404, according to some embodiments. FIG. 4 includes a representation of the surface device 402 and its intrinsic capabilities 406, 408, 410, 420, 424, and the touch table 404 and its intrinsic capabilities 412, 414, 416, 422, 426. It is important to note that both touch table and surface device elements combine to create unique interaction capabilities, and each may potentially be a simple or complex electronic device. Additionally, it is possible to use many surface devices simultaneously on a single touch table, though this is not indicated in the figure. FIG. 4 includes the surface device 402 including inputs 406 and outputs 408 of the physical item 410 which also includes internal firmware 420 and wireless communications capabilities 424 and also the touch table 404 including display surface 412 and peripherals 414 of the main computer 416 which also has internal software 422 and wireless communications 426.

In FIG. 4 the surface devices 402 interact with the touch computer 404 to create an interactive, tangible experience for the user. The location, state, inputs 406, and outputs 408 on the surface device body 410 are perceived by the user while observing the touch computer display 412 and other touch computer input and output peripherals 414 such as speakers and video game controllers. These are controlled by the main software processor 416 which runs application software 422 with graphical elements such as a game or teaching application. The state of the surface device is interactive with the touch computer and its software through both wireless communication 424 and 426 and direct interpretation of the surface device location and size on the surface.

In this figure, a limited set of communication modes, namely a touch screen and wireless communications, enables a very broad array of input and output modes from multiple sources and encompassing multiple senses and multiple surface devices may be used identically at the same time, enabling extensive multiplexing of input and output modes. An example of this is a chess game in which each game piece may independently create display and sound interaction with the players. Moreover, the appearance and role of the game pieces may be established through the touch table graphics, either around the game piece, or visible through a transparent or hollow game piece.

Figure 5:
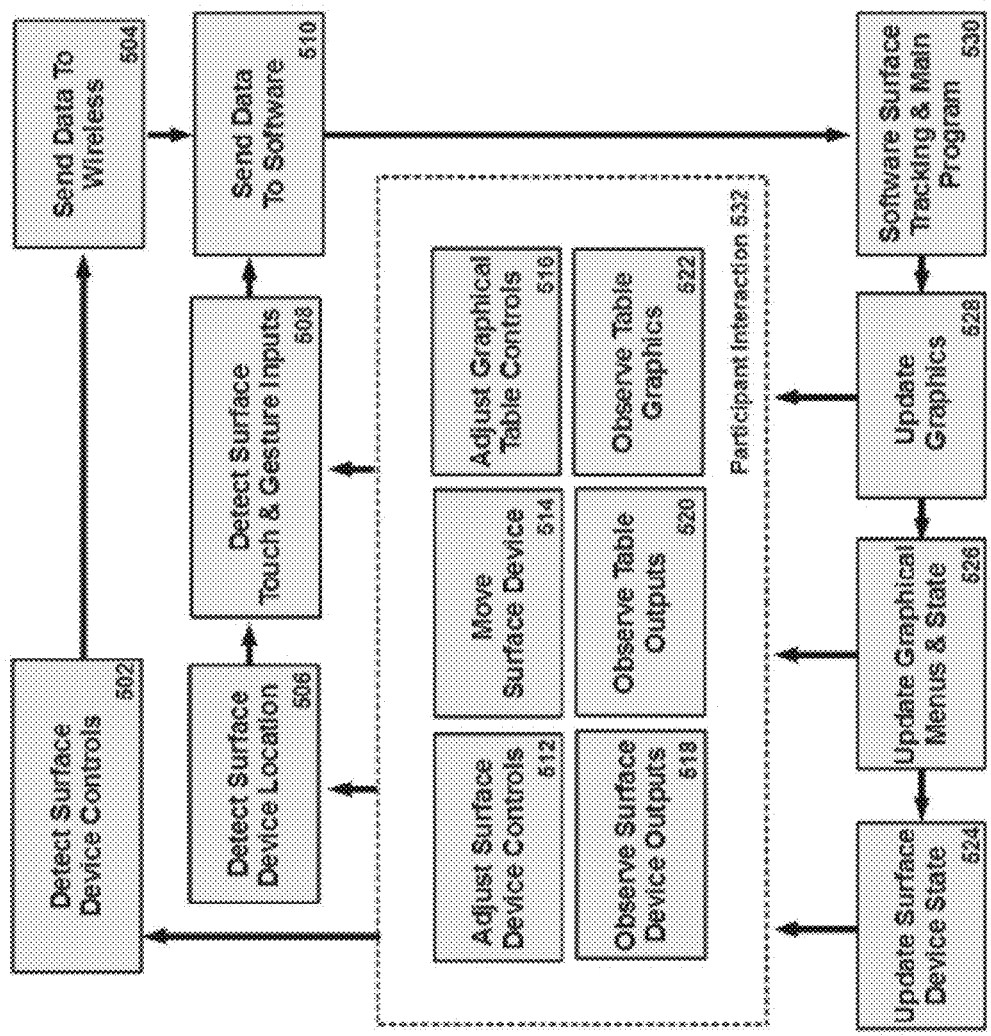
FIG. 5 is a flow chart illustrating the interaction and update sequences that may be executed during the operation of a touch sensitive computing surface, according to some embodiments of the present disclosure.

FIG. 5 is a flow chart illustrating a real-time interaction and update sequence that may be executed during the operation of a surface device, according to some embodiments. User inputs and reactions 532 are important, and drive detection 502 and update routines 524, 526, and 528 that are distributed between the surface devices and their electronics/firmware and the touch surface and its electronics/firmware. Many surface devices may be used and the essential update loop is unchanged.

As shown in FIG. 5, the main program 530 provides graphics 528 interactive menus 526 and the current surface device control 524 in real-time. Observing the tangible elements and system outputs, the user may interact 532 with the touch computer/surface device system in a variety of ways 512-522. Upon the user's observing the software outputs and adjusting controls or locations, the surface device senses changes to controls 502 and the touch computer senses changes to locations 506 and touch inputs 508, and these are sent to the software either through wireless link 504 or direct hardware communications 510. The participant interaction is then interpreted by the main program 530, restarting the real-time interaction loop.

As an example of the flow of use described by FIG. 5, consider a user that approaches an operating touch table with two active action-figure-type surface devices on its top. The user observes the positions and poses of the action figures 518 and also the underlying graphics 522 on the touch table around and under the figure that illustrates possible movements or explorations available to the user. Perhaps a sound 520 invites the user to move one of the surface devices. The user moves the figure along the surface 514 and also adjusts the figure's pose 512 and moves graphical elements displayed on the touch table with his fingers 516. Invisible to the user, the touch table detects the changes in the figure 506 and also the changes to the action figure's pose 502 which in this example may be raising the figure's sword, which is sent by wireless communications 504 to the touch table. All of the data associated with the user interactions are therefore transmitted 510 to the touch table software 530, which is responsible for updating the table graphics 528 such that a new portion of the game map and a graphical adversary is revealed on the display, and updates the game mechanics 526 such that since the figure's sword is now raised, a particular touch gesture may signify an attack and trigger an output from the surface devices 524 such that a speaker in the action figure says "Chop!" and a speaker in the other action figure, which was never moved says "Watch out!". Completing the loop to the participant 532, these changes in graphics and output are observed 518, 520, 522 and the user may move or adjust the action-figure surface objects again 512, 514, expecting a continuation of the game play through new graphics and outputs and new manipulation possibilities for his hands on the touch table 516.

FIG. 4 demonstrates the update loop from the center to the top, to the bottom and to the center, to repeat. With modern computing devices, this loop may be completed at a rate faster than the user-interaction speed (perhaps 40 Hz). Similarly, with even simple wireless communications technologies (IR, BlueTooth, ZigBee, etc.) enough data may be moved through the wireless link to allow closely-coupled, real-time input and output from the surface devices and the touch display. As in other figures, elements that are principally handled by the surface devices are shaded in gray and elements handled by the surface computer are shaded in blue.

In some embodiments the wireless communications may operate without direct intervention of the user. This creates a combined reality effect, such as a game board recognizing game pieces which, in turn light up when placed on the table.

Figure 6:
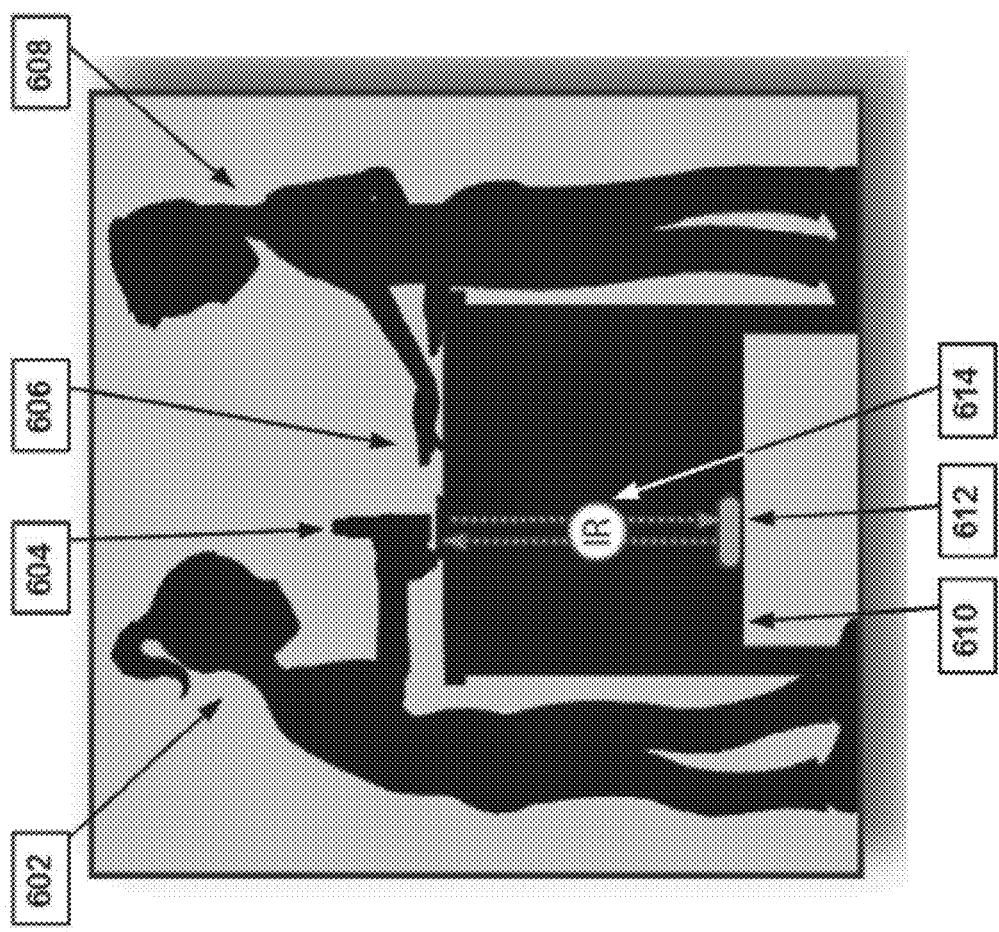
FIG. 6 illustrates a configuration of wireless communications between physical surface devices and a touch sensitive computing surface, according to some embodiments of the present disclosure.

FIG. 6 indicates one layout of the wireless communications, according to some embodiments. Users 602 and 608 interact with surface devices 604 through manipulation of location, controls, and responses. Touch inputs 606 also may be used to interact with graphical software elements. The touch computer 610 senses changes to surface objects that are broadcast through a wireless technology such as IR or RF 614 and received by the computer 612.

A variety of wireless communications technologies may be applied to the present disclosure including IR, optical, or RF (including BlueTooth, WiFi, or ZigBee). The present disclosure has the ability to create innovative user interface concepts through the combination of wireless connectivity and touch devices, especially with respect to the addition of wireless-enabled surface devices on top of the touch screen. It may also be noted that surface object augmented reality effects under this disclosure may be created without wireless communications through manipulation of touch and position detected more directly by the touch table.

Figure 7:
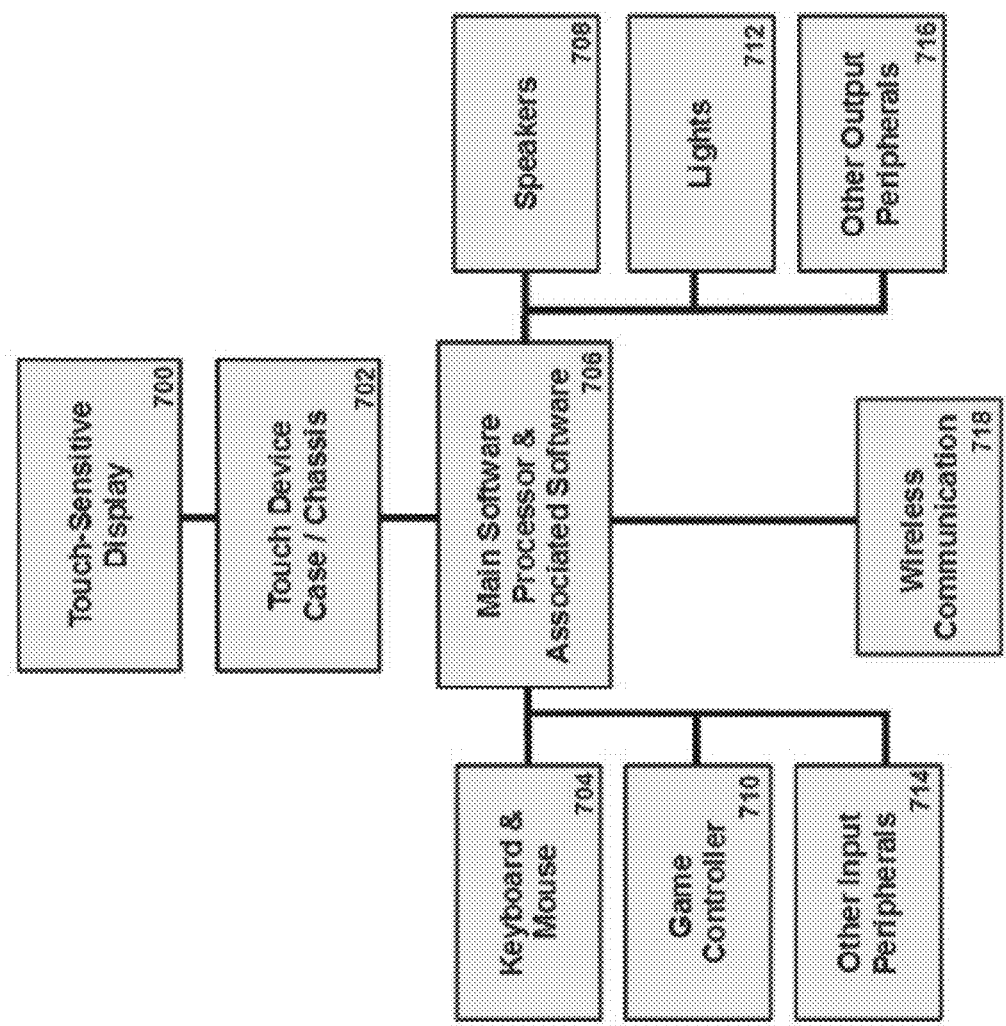
FIG. 7 is a system diagram illustrating functionality of a touch sensitive computing surface, according to some embodiments of the present disclosure.

FIG. 7 is a system diagram illustrating functionality of the touch computer, according to some embodiments. The touch computer used in the system may have a variety of components and functions. The touch/display surface 700 is the center of user interaction. This is attached via a chassis 702 to the main processor 706 which runs the interactive application. The software may use additional input sources 704, 710, and 714, such as game controllers, mouse, track ball, or position sensors, and may also provide additional outputs 708, 712, and 716, such as speakers, lights, vibration, projectors, or fog, in addition to the graphical output of the touch surface around and through surface objects. As an example, a wireless controller like a track ball may be used both as a control device using position on the touch table, similar to a mouse, and also provide interaction using the ball itself and buttons on the controller. Output modes may include vibration of the track ball controller as well as changing projected or illuminated displays, plus graphics on the table top around the track ball, perhaps indicating options, or even through a transparent track ball, changing color and labeling of input modes. A wireless communications system 718 can provide two-way connectivity to the surface devices manipulated on the touch surface to both sense state changes in the surface devices and also trigger state changes from the software.

The importance of the functionality described in FIG. 7 is to establish key elements that may be combined in some embodiments to create a virtual reality experience using the touch computer as an interactive table. This level of interactivity arises from the interplay of the graphics displayed by the touch computer and surface devices placed directly on these images and affecting them in real time.

Figure 8:
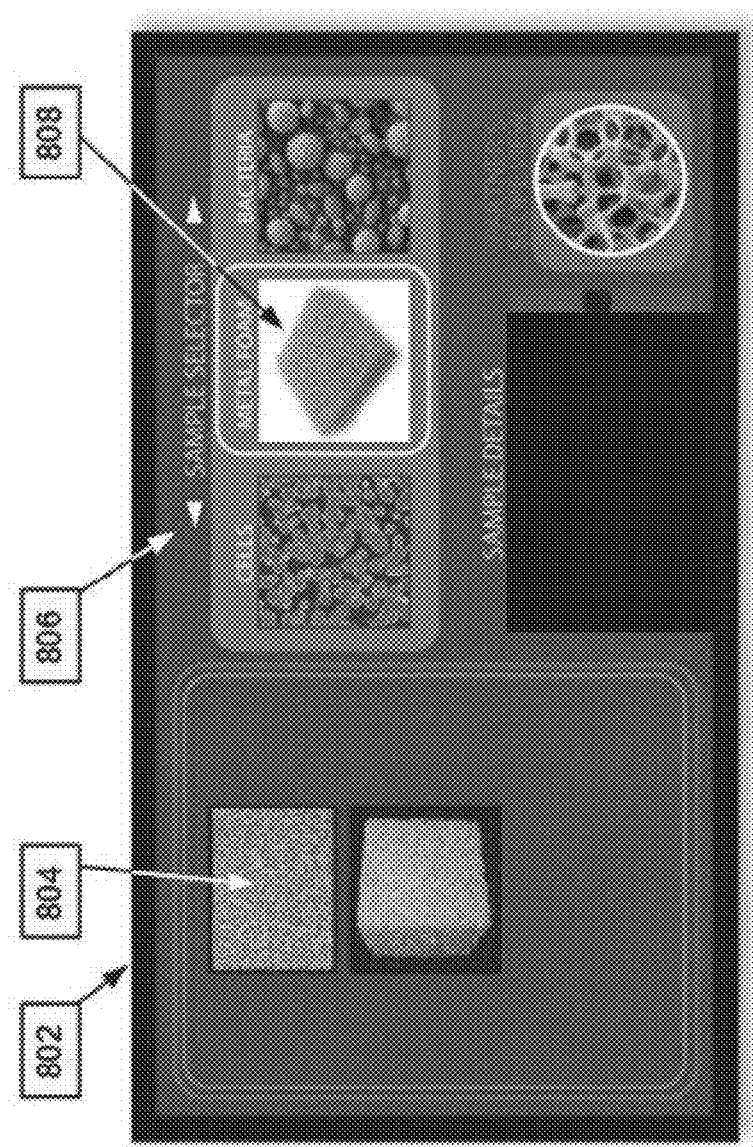
FIG. 8 illustrates a touch sensitive computing surface display, according to some embodiments of the present disclosure.

FIG. 8 is an example of the display that might be visible on the surface computer, according to some embodiments. FIG. 8 includes the display screen 802, under-object graphics 804, other control graphics 806, including material selector buttons 808. Graphical software displayed on the touch computer may include graphical elements 804 that track and move with the surface devices and change according to surface device controls (such as zoom and focus). Additionally, touch-activated menus 806, and multi-user controls and views may be supported for interactive group or team use.

Note that the graphics indicated in FIG. 8, may not be stationary and unchanging, but rather part of an interactive computer application such as a game or analytical program that changes in response to user actions. In particular, the actions of the user to move and adjust the surface devices placed on the touch computer surface.

Figure 9:
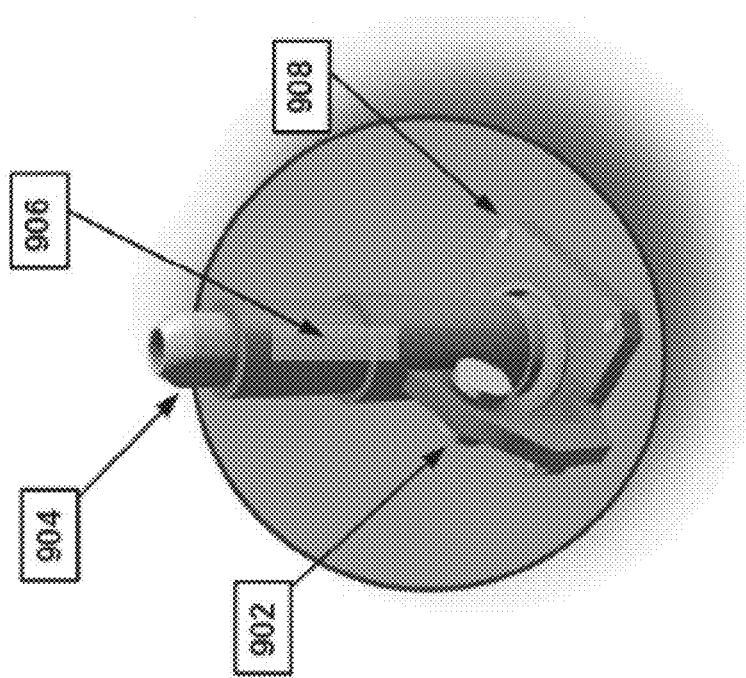
FIGS. 9 and 10 illustrate physical surface devices for interaction with a touch sensitive computing surface, according to some embodiments of the present disclosure.

FIG. 9 is a microscope-shaped surface device, according to some embodiments. FIG. 9 includes microscope control knobs 902, the microscope body that may be looked through 904, an indication of internal electronics 906, and the object's base 908 that rests on the touch table. The physical surface devices 904 may take the form of tools or devices with control knobs 902 that affect the software in a manner that simulates the control functionality of physical systems, such as a microscope. Internal electronics 906 sense and translate control adjustments to wireless data that is received and interpreted by the touch computer which reflects the changes in the software graphics. The software may also send wireless messages to the surface device to change state and outputs, such as lights and sounds. Additionally, the size, orientation, and location of the surface device base 908 can be tracked by the touch computer, allowing tangible control over software elements.

Using a surface device like this one, virtual laboratory experiments are possible that sharpen a student's skills using the controls of real laboratory equipment, but taking advantage of a large digital image library, thereby speeding up sample preparation and making education less expensive. As the focus and positioning knobs on the surface device are changed, the software reacts by modifying the image seen through the eyepiece, which is actually displayed on the touch computer screen. This is one example out of many educational possibilities including using beakers, heaters, mechanical systems, and robots as surface devices. More basic educational applications include letter or number blocks, especially transparent blocks that provide physical manipulation, but the appearance of which is governeed by the underlying touch table graphics that track and move with the blocks. Early education applications include math, spelling, sorting, pattern matching, and sentence formation.

In addition to educational applications for surface devices, there are a variety of possibilities for entertainment. Current toy products that combine tangible action figures with computer software have very limited interaction possibilities with regards to manual manipulation of the action figures. Generally the figure is placed or attached to the computer system and the gameplay is essentially identical to a software-only game. The surface device design can allow additional manipulation of the figure to affect game play and be closely integrated with the software. Additionally, traditional board game concepts can be augmented with game pieces that change label or color through transparency, or with additional menu elements to allow user manipulation of game piece identity or capabilities.

Figure 10:
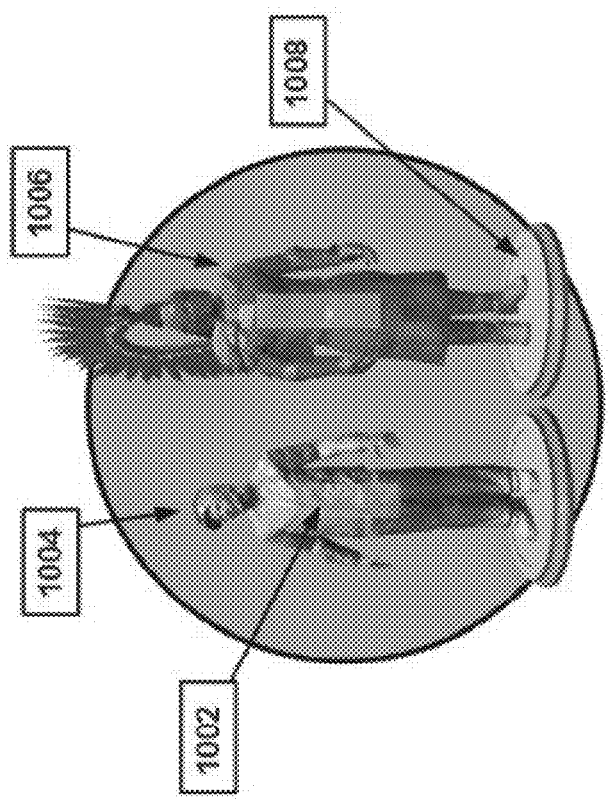

FIG. 10 shows examples of action figure surface devices, according to some embodiments. The physical surface devices 1004 may take the form of toys, models, or figures with control elements such as a pivoting arm 1006 that affects the software in gameplay. Internal electronics 1002 sense and translate control adjustments to wireless data that is received and interpreted by the touch computer which reflects the changes in the software graphics around and beneath surface objects. The software may also send wireless messages to the surface device to change state and outputs, such as lights and sounds evocative of gameplay. Additionally, the size, orientation, and location of the surface device base 1008 are tracked by the touch computer, allowing tangible control over software elements.

The wireless connectivity between the surface devices and the touch computer is not necessary, but enables additional interactive possibilities. The mechanical manipulation of the surface devices on the touch computer and responses of the electronics in the surface devices play an important role in the interactivity of the device. For example, the surface device may simply react to the display color underneath it or make sounds and display outputs randomly, to which the user responds, thereby affecting the software.

Figure 11:
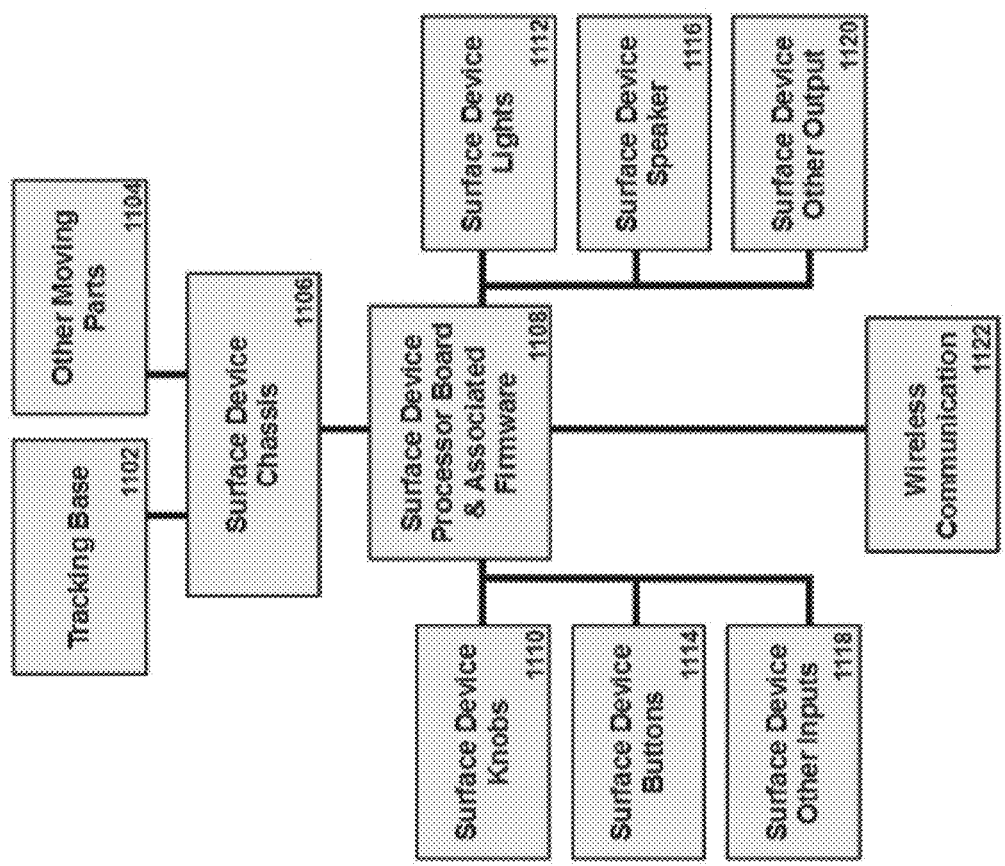
FIG. 11 is a system diagram illustrating the functionality of a physical surface device, according to some embodiments of the present disclosure.

FIG. 11 is a system diagram illustrating the intrinsic functionality of one surface device, according to some embodiments. The surface devices used in the system may have a variety of components and functions. The device chassis 1106 enables physical manipulation that is tracked by the touch computer when place on its base 1104. The chassis may also include movable parts 1104 which trigger software responses. Inside the surface device, a processor 1108 tracks the state of the device and controls its functions. The surface device may use additional input sources 1110, 1114, and 1118, such as touch screens, light sensors, position sensors, cameras, or microphones, and may also provide additional outputs 1112, 1116, and 1120, such as sound, vibration, lights, integrated displays, and movement, beyond the tracked, physical presence of the surface device on the touch surface. A wireless communications system 1122 provides two-way connectivity to the touch computer.

The manipulation of electronic surface devices place directly on top of a horizontal touch computer is central to some embodiments. No single attribute indicated above is critical to achieving the unique interaction functions described as a "augmented reality" experience. In some embodiments, the present disclosure has the ability for the touch surface to react in an intuitive way to manipulations of the objects set on it.

Figure 12:
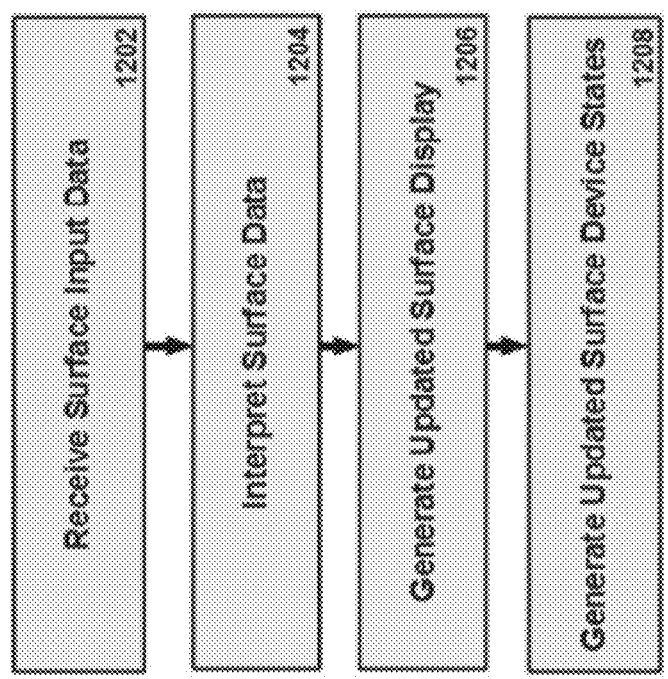
FIG. 12 is a flow chart illustrating a computerized method for receiving input to a touch-sensitive computing device and making adjustments to the display on the surface, according to some embodiments of the present disclosure.

FIG. 12 is a flow chart illustrating a computerized method for receiving input to a touch-sensitive computing device and making adjustments to the display on the surface, according to some embodiments. FIG. 12 includes software processes for receiving the surface input data from both finger touches and objects on the touch table, interpreting this data (1204) in the context of the software program or game currently active, generating an updated surface display (1206) in response to the new data, and generating updated states of the objects on the table (1208) such as internal firmware state, lights, or sounds.

At step 1202, data representing touch gestures from users and describing surface devices placed on the touch-sensitive computing device is received. While different touch table technologies receive position and touch information in different ways (capacitive, optical, etc.) this processing step represents converting all raw touch table data to position, size, and orientation data suitable for use by the main program. As an example, the user may move action-figure-like surface objects, change their poses, and touch menus and graphical elements with their fingers. All of this manipulation can be converted into software-actionable data in this step such that the program may process the next step in the interaction, changing the image, such as a map or game board displayed, opening menus and pull-downs, and updating specific statistics of the game character represented by the figure, such that a particular weapon or action is indicated in the software that was suggested by a modified pose, for instance.

At step 1204 the data is interpreted with regards to controlling or modifying the application software. As described above, once the raw touch table and surface object data is received and converted into software-actionable information, the main program may interpret the data to discern user input intentions and suitable real-time responses. For example, if a user finger touch on a menu graphic is received in step 1202, in step 1204 processes in the main program may interpret this information in the context of the program to trigger intended results, such as opening up a graphical menu. This interpretation can be specific to the particular program running, and it is not necessary that every use of a given hardware implementation have the same response to touch and surface object inputs. For example, a game about boats might interpret an illegal move if the surface object is moved out of an area displaying water, where a game about kittens may do the opposite, interpreting that the surface object should not be in the virtual water. Illegal moves can be indicated to the user by changing the color of graphics around or under the game piece, or restricting the movement of a graphic that tracks the physical piece, requiring the player to backtrack to replace the piece on its representative graphic. Transparent pieces allow color and labeling changes to be displayed on the table and observed in or through the game piece.

At step 1206 the software display is updated, modifying the touch surface appearance in conjunction with the original user input. This means that the software-actionable data received and interpreted in prior steps is actually indicated to the user on the touch table display and other outputs in step 1206. Continuing previous examples, in this step a graphical menu may be displayed as "open" in response to the appropriate touch event, and an "x" or buzzer sound might indicate illegal moves in the example of a game in which water obstacles may be observed. It is important to note that the touch table may have multiple output modes that are triggered in this step including the main display (creating a red "x" under or around the surface device or touch location), speakers (creating a buzzer sound), additional displays (such as moving an image to a projected display on the wall in response to a gesture), and external lights (such as dimming the room lights in response to a gesture or surface object rotation).

At step 1208 the state of the surface devices is updated providing the user with additional stimuli arising from the initial input. This step may involve the use of active surface devices that provide another dimension of user interaction. In the case that the surface objects are not merely inanimate objects tracked and interpreted by the touch table, electronic surface devices may themselves have internal software states and output modes that may be updated. Continuing the above examples, an electronic cat surface device may itself emit a "distressed meow" sound if placed over a graphic of water. This allows greater localization and virtualization of the game play. Output modes may include surface devices that make sounds or vibrate in response to specific movements relative to touch table graphics. Additionally, the surface device may be transparent or may itself have a display that reacts to the touch table program, such as a transparent block, smart phone, or tablet displaying a compass needle that reacts to virtual magnets distributed on the touch table screen. The magnet reading may spin if the object is removed from the surface, and change when positioned on the surface to indicate the magnetic field that may result from the displayed configuration.

Figure 13:
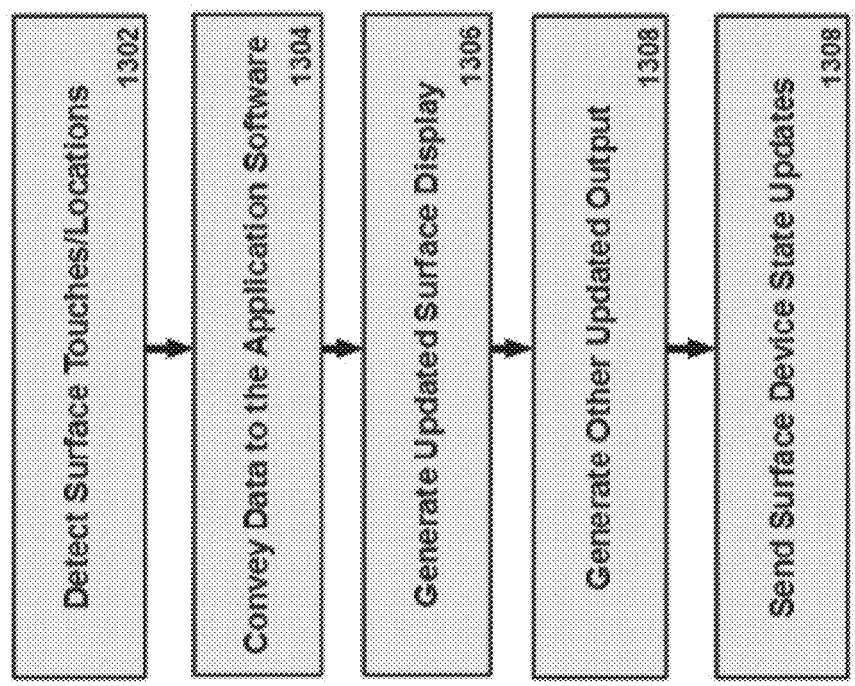
FIG. 13 is a flow chart illustrating a computerized method for processing surface touches, according to some embodiments of the present disclosure.

FIG. 13 is a flow chart illustrating a computerized method for processing surface touches, according to some embodiments. This figure provides additional detail not shown in FIG. 12, specifically relating to the operations performed by the main processor associated with the touch table. FIG. 13 includes processes to detect surface touches and object locations 1302, conveying this data to the main application 1304, updating the touch table surface display 1306, generating updates to all local output devices 1308, and finally sending updates to all surface objects and non-local output devices 1310. The blue boxes indicate that all of these processes are performed by, or scheduled by, the main processor, typically associated with the touch table.

At step 1302, the touch table detects user touches and gestures as well as the location of surface devices placed on the touch surface. This is described in more detail in association with FIG. 12, since the touch table is generally the main hardware system detecting touches and object locations on its surface. It is not necessary that the main processor by incorporated into, or even physically attached to the touch table, as some touch surfaces are capable of sending raw or processed data to an ancillary processor, possibly controlling many such touch surfaces. The primary intention of the figure is to indicate that at some point the touch information needs to be detected and packaged for transmission to the main program to be interpreted and drive the user interaction.

At step 1304, both user touches and surface device location data is conveyed to the main program along with any data received from the surface devices themselves. As noted above, the transmission of the data may be within a single device or networked among many devices either with wires or wirelessly. There may be many touch surfaces delivering information to one processor, or there may be many computers all receiving information from a single touch surface, or any other combination. The intention of this step is to establish that there needs to be a process by which the main application responsible for the user interaction receives the touch information in a format that is program-actionable and may trigger appropriate interface responses, such as updating graphics, opening menus, changing game boards, etc.

At step 1306, the surface display is updated according to the software. Since in some embodiments, the display represents a changeable game board or virtual desktop, changing the touch table display is important to the user interface, and generally is done in direct response to user inputs, similar to moving windows and icons graphics in response to mouse controls in a traditional computer interface design. Unlike a traditional, one-mouse interface, in the described system, multiple touches, positions, and inputs from many hands, objects, and users may be processed at the same time, making the system very collaborative in some embodiments. Step 1306 does not presuppose what kinds of displays or graphics are updated or how, but rather this may be specific to the interface and software application being executed. Step 1306 indicates that in the described method there may generally be a change in the graphics displayed on the touch table to indicate the user interface intention and provide feedback to the user.

At step 1308, any other outputs, such as sounds, vibrations, or additional lights are triggered. Some additional output modes may be local to the touch table system or directly controlled by this system, regardless of the particular architecture of touch-sensitive devices and processors and communications. These are distinct from outputs controlled by other, remote processors, such as the surface objects, but may still be triggered by, or in communication with the main application. Examples of the processes represented in step 1308 include sounds from speakers in or around the touch table, other displays directly controlled by the main process, such as a projected screen nearby, or even the release of fog or scents triggered by the user interface.

At step 1310, updated state data for the surface objects and devices set on the touch surface are conveyed. Though an active surface device may have its own processor that interprets inputs and provides independent outputs, generally there may be a level of communication between these semi-independent systems and the main application to create a unified interface experience. As an example, the data sent from the main process to a surface device may only be state information that does not directly trigger any perceptible change. One case is an action figure with a certain amount of strength or life remaining in the game. This may update the state such that if the figure is removed from the table, it may report its "life value" at any other time through the push of a button. Alternately, this life value might trigger an output such as a sound when some other game process sends data, such as when a particular "report health" button is pressed on the touch table screen, all of the surface figures on the touch table may all report their health, perhaps saying "I feel great!" or "I need food badly".

The entire process represented in FIG. 13 may be viewed as a loop that executes in real time. The application may be turn or instance-driven, or may be changing in real-time independent of user interactions.

Figure 14:
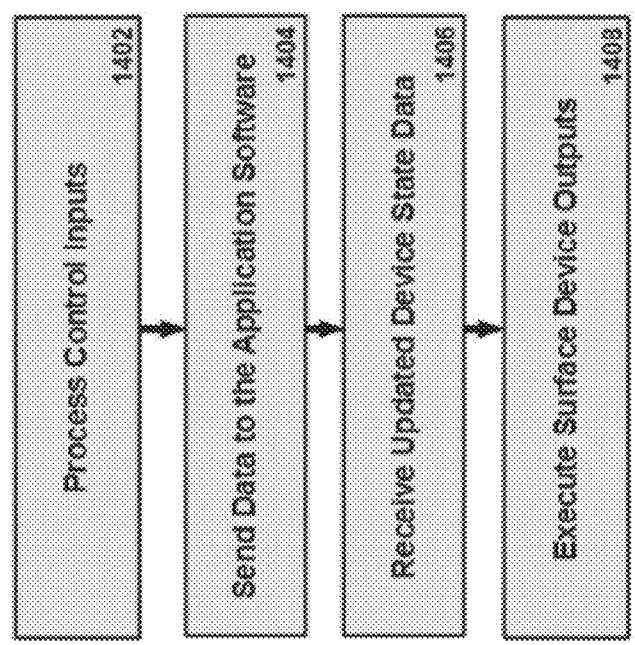
FIG. 14 illustrates is a flow chart illustrating a computerized method for processing and communicating control inputs of surface devices placed on a touch table, according to some embodiments of the present disclosure.

FIG. 14 is a flow chart illustrating a computerized method for processing and communicating control inputs of surface devices placed on a touch table, according to some embodiments. FIG. 14 includes steps that process control inputs local to the surface device 1402, send relevant data regarding the surface device state to the main application process 1404, receive new information regarding other user inputs and the main application 1406, and perform any output functions required as part of the user interface 1408. The entire process represented in FIG. 14 may be viewed as a loop that executes in real time. Updates may be turn or instance-driven, or may be changing in real-time independent of user interactions.

At step 1402, adjustments to direct controls on the surface devices are interpreted. These controls may be knobs and buttons on an otherwise unrecognizable object, for example if localized control was needed that changed function depending where it is on the table. An instance of this is a knob that changes the color of blocks beneath it and may be moved from block to block, and the knob repeatedly adjusted. In this case, the knob may always changes color, but the block it is addressing may be specific to the controller's location on the table and the specific graphics currently being displayed. If the user changes the arrangement of blocks using finger drag gestures, the position required to change the block's color may likewise be adjusted. The local controls on surface objects may also be representative of recognizable instruments, characters, or game-play actions. For example, if the surface object is in the form of an action-figure, changing moveable elements like arm positions or a drawn weapon may be sensed by local electronics in the surface object and become part of the user interface. Similarly, a surface object that looks like a microscope may have zoom and focus knobs similar to a real microscope that create interface effects that mimic these optical effects.

At step 1404, this data is conveyed to the main program to join the touch, location, and orientation data to determine the software response. As part of this step, the inputs applied by the user to the surface objects may be communicated to the application that updates the graphics and outputs according to the intended interface experience. As an example, a surface object that is in the shape of an action figure may have moving parts that affect the game play represented on the screen. An instance of this might be a toy dragon, that when you press its head it temporarily lights up red using LED illuminators embedded in the toy. The status of the dragon as "in the red state" may be sent to the main application, if a corresponding fire effect is to be displayed on the touch table display around or under the figure.

At step 1406, updated state information is received by the surface devices from the main program. Continuing the dragon toy example from the step above, if the "red state" control is activated and this information is interpreted by the main program to fill an area of the display with a fire effect, there may be other surface objects in contact with the resulting virtual fire that may also have their state changed as a result. Perhaps another dragon figure some distance away also turns red when in contact with a fire graphic. This state change to red of the second dragon may be triggered by receiving information from the main program. Therefore, the internal state variable that defines the dragon as "red" or "not red" can be modified by receiving wireless information from the touch table.

At step 1408, these trigger the intended output modes of the surface devices such as lights, displays, and sounds. This step represents the actual change of tangible interface elements local to a surface object based on the software application. In the prior "red dragon" example, this may include actually changing the state of the second dragon to "red" in response to being touched by the flame graphic. Other output modes may include indicator lights on the surface object that show the user the current internal state of the device, such as "the knob now changes color of blocks below the surface object" versus "the knob now changes size of blocks below the surface object". As described previously, surface object output modes may include sounds, lights, vibrations, movements, or other tangible changes local to the surface objects.

The subject matter described herein may be implemented in digital electronic circuitry, or in computer software, firmware, or hardware, including the structural means disclosed in this specification and structural equivalents thereof, or in combinations of them. The subject matter described herein may be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file. A program may be stored in a portion of a file that holds other programs or data, in a single file dedicated to the program in question, or in multiple coordinated files (e.g., files that store one or more modules, sub programs, or portions of code). A computer program may be deployed to be executed on one computer or on multiple computers at one site or distributed across multiple sites and interconnected by a communication network.

The processes and logic flows described in this specification, including the method steps of the subject matter described herein, may be performed by one or more programmable processors executing one or more computer programs to perform functions of the subject matter described herein by operating on input data and generating output. The processes and logic flows may also be performed by, and apparatus of the subject matter described herein may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor may receive instructions and data from a read only memory or a random access memory or both. The essential elements of a computer are a processor for executing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory may be supplemented by, or incorporated in, special purpose logic circuitry.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

What is claimed:

1. A method for operating a touch sensitive integrated display system comprising:
   detecting a plurality of multiuser inputs via the touch integrated sensitive display system;
   interpreting, using at least one compute processor, each input in accordance with a location of the associated input on the touch integrated sensitive display system and a gesture of the associated input;
   generating a display of a graphical image based on the interpretation;
   updating a state of objects displayed on the touch sensitive integrated display system based on the interpretation;
   determining whether to generate an output to another a device comprising an eyepiece that interacts with and is separate from the touch sensitive integrated display system based on the interpretation;
   sending the output to the other separate device based on the determination; and
   displaying the generated display of the graphical image on the touch sensitive integrated display system which is viewable through the eyepiece.

2. The method of claim 1, further comprising:
   tracking a position of the separate device relative to the touch sensitive display; and
   updating the state of the objects displayed on the touch sensitive display based on the tracked position.

3. The method of claim 2, wherein the determination of whether to generate the output to the separate device is based on the position of the separate device being tracked to a predetermined position relative to the touch sensitive display.

4. The method of claim 1, further comprising:
   tracking an orientation of the separate device relative to the touch sensitive display; and
   updating the state of the objects displayed on the touch sensitive display based on the tracked orientation.

5. The method of claim 1, further comprising:
updating the state of the objects displayed on the touch sensitive display in response to movement of the separate device while in contact with the touch sensitive display.

6. The method of claim 1, further comprising:
generating an output from one of a speaker and a light based on the interpreted inputs.

7. The method of claim 1, wherein the interpreting comprises determining a position, size, and orientation of each input relative to the touch sensitive display.

8. The method of claim 1, wherein the separate device and the touch sensitive table communicate via a wireless communication protocol.

9. The method of claim 8, wherein the wireless communication protocol is one of infrared, radio frequency, visible light, variable LED/LCD display markings, Bluetooth, ZigBee, and Wi-Fi.

10. The method of claim 1, wherein the separate device is at least one of a toy, model, and action figure.

\* \* \* \* \*